United States Patent
Kobayashi et al.

(10) Patent No.: US 7,880,781 B2
(45) Date of Patent: Feb. 1, 2011

(54) SOLID-STATE IMAGE PICKUP APPARATUS MULTIPLYING SIGNAL CHARGES DEPENDING ON IMAGING CIRCUMSTANCES

(75) Inventors: Hirokazu Kobayashi, Asaka (JP); Mitsuru Iwata, Asaka (JP)

(73) Assignee: Fujifilm Corporation, Tokyo (JP)

( * ) Notice: Subject to any disclaimer, the term of this patent is extended or adjusted under 35 U.S.C. 154(b) by 638 days.

(21) Appl. No.: 11/898,892

(22) Filed: Sep. 17, 2007

(65) Prior Publication Data
US 2008/0079831 A1 Apr. 3, 2008

(30) Foreign Application Priority Data
Sep. 29, 2006 (JP) .............................. 2006-267956

(51) Int. Cl.
H04N 9/64 (2006.01)
(52) U.S. Cl. ..................................... 348/243
(58) Field of Classification Search ................. 348/294, 348/243
See application file for complete search history.

(56) References Cited

U.S. PATENT DOCUMENTS

| | | | | |
|---|---|---|---|---|
| 4,780,764 A | * | 10/1988 | Kinoshita et al. | ........... 348/296 |
| 5,528,059 A | | 6/1996 | Isogai | |
| 5,703,642 A | * | 12/1997 | Stevens | ....................... 348/317 |
| 6,730,899 B1 | * | 5/2004 | Stevens et al. | ........... 250/208.1 |
| 7,492,404 B2 | * | 2/2009 | Stevens et al. | ............... 348/314 |
| 7,619,667 B2 | * | 11/2009 | Sakai et al. | .................. 348/243 |
| 2001/0019361 A1 | * | 9/2001 | Savoye | ....................... 348/222 |
| 2006/0250509 A1 | * | 11/2006 | Koshiba | ..................... 348/272 |

FOREIGN PATENT DOCUMENTS

| | | |
|---|---|---|
| JP | 8-340099 A | 12/1996 |
| JP | 2005-286470 A | 10/2005 |

* cited by examiner

*Primary Examiner*—Lin Ye
*Assistant Examiner*—Amy Hsu
(74) *Attorney, Agent, or Firm*—Birch, Stewart, Kolasch & Birch, LLP (57) ABSTRACT

A solid-state image pickup apparatus selects, in a first image pickup circumstance in which dark current is liable to occur in vertical transfer paths of an array of photo-sensors, a first transfer mode in which the potential well capacity in the vertical transfer paths is relatively small, and, in a second image pickup circumstance in which the dark current is small in quantity, a second transfer mode which is greater in potential well capacity than the first transfer mode. As a positive voltage applied to the read-out gates of the photo-sensors, a first voltage mode indicating a relatively low positive voltage that suppresses impact ionization is set in the first image pickup circumstance, and, a second voltage mode indicating a positive voltage higher than in the first voltage mode is set in the second image pickup circumstance so as to cause the impact ionization.

5 Claims, 8 Drawing Sheets

SOLID-STATE IMAGE PICKUP APPARATUS MULTIPLYING SIGNAL CHARGES DEPENDING ON IMAGING CIRCUMSTANCES

BACKGROUND OF THE INVENTION

1. Field of the Invention

The present invention relates to a solid-state image pickup apparatus, and more specifically to a solid-state image pickup apparatus for reading out signal charges from the photo-sensors of an image pickup section by applying a high voltage to read-out gates of the image pickup section to cause impact ionization to occur to thereby multiply the signal charges.

2. Description of the Background Art

Conventionally, in solid-state image sensors such as a CCD (Charge-Coupled Device) type of image sensors, photo-sensors such as photodiodes photoelectrically convert incident light to corresponding signal charges, vertical and horizontal transfer paths transfer the signal charges vertically and horizontally, respectively, and an output amplifier converts the signal charges to voltage signals to output the latter. Normally, each of the read-out gates is provided between corresponding one of the photo-sensors and the vertical transfer path associated therewith. A solid-state image pickup apparatus with such a solid-state image sensor feeds a timing gate pulse to the read-out gates to send out the signal charges stored on the photo-sensors to the vertical transfer paths.

In interline transfer CCDs widely used in digital cameras, a high positive voltage pulse is normally applied to the read-out gates to read out signal charges from the photo-sensors. Because of an increase of the number of pixels with higher pixel density, the read-out gates have finely been fabricated. Therefore, in the read-out gates, the value of an electric field defined a potential difference per distance becomes extremely great, so that a strong electric field is prone to occur. The photo-sensor and the read-out gate normally form a p-n junction in between. If a strong electric field occurs across the p-n junction, impact ionization will occur.

If the impact ionization specific to each pixel occurs as set forth above, the signal charge read out through the read-out gate will be multiplied, and consequently, advantages such as high picture quality by a common amplifier of CCDs will be ruined. Because of this, there are known techniques for avoiding the impact ionization.

For example, in a solid-state image pickup apparatus disclosed in Japanese patent laid-open publication No. 340099/1996, the interface between a charge storage of an N-type impurity diffusion layer and a read-out channel of a P-type impurity diffusion layer has another N-type impurity diffusion layer formed with an impurity density lower than the charge storage, whereby a potential near the p-n junction between the charge storage portion and the read-out channel is relaxed gradually. Therefore, even if, near the p-n junction, there is a part where dark current occurs, there is no possibility that a phenomenon close to avalanche multiplication will take place. That is, impact ionization due to a strong electric field is suppressed.

However, for use in image pickup apparatuses, there are cases where signal charge obtained as a result of picking up an image of a subject field is small. In such cases, the noise of the output amplifier itself can be a predominant factor of the signal-to-noise ratio. Hence, there are known techniques that utilizing the impact ionization so as to multiply the signal charges prior to the output amplifier to thereby attain a high signal-to-noise ratio.

For instance, in a photoelectric conversion apparatus taught in U.S. Pat. No. 5,528,059 to Isogai, drive means applies a pulse signal to the gate or drain electrode of a J-FET image sensor to drive the apparatus. By making the gate and drain voltages high, a depletion layer between the drain region and the channel end portion forms a high electric field region, so that impact ionization occurs and electrons flowing through the drain region are multiplied. Thus, before amplification by the output amplifier, signal charges are multiplied, whereby the signal-to-noise ratio can be improved.

These techniques are effective in the case where the predominant component of dark noise, i.e. noise under optically shielding, is caused by the amplifier. In the case where the dark current occurs in the vertical transfer paths to cause the dark noise to be worsened, such driving is performed in order to reduce the dark current that the charge transfer capacity of the vertical transfer paths is reduced.

For example, in an image pickup apparatus disclosed by Japanese Patent laid-open publication No. 2005-286470, when setting low-sensitivity and high-sensitivity pickup modes, a solid-state image sensor is driven in first and second read-out modes, respectively. In the first read-out mode, there is a large quantity of incident light, so that the potential well capacity is reduced. In the second read-out mode, there is a small quantity of incident light, so that the potential well capacity is increased. In this apparatus, by changing the signal-charge transfer capacity according to the quantity of light, a high saturated charge quantity and low dark current are compatible with each other.

However, as set forth in the aforementioned U.S. patent to Isogai, when signal charges are multiplied using the impact ionization, it is necessary to increase the transferable capacity of the vertical transfer path, so that dark current cannot be reduced any longer by means of the technique disclosed by the aforementioned '470 Japanese publication.

In the aforementioned '470 publication, for the purpose of reducing the capacity of a potential well that stores an electric charge in the vertical transfer path, the number of vertical transfer electrodes used is reduced, thus merely reducing the dark current from the surface.

In conventional image pickup apparatuses making use of the impact ionization, in the image pickup conditions in which there is a large quantity of dark current, noise will be increased by the impact ionization.

If individual image sensors have different property from each other, they are often different in multiplication factor of signal charge by impact ionization from sensor to sensor. In such a case, when the potential wells of a vertical transfer path are uniform in capacity between the image sensors connected thereto, there are cases, even under the same imaging condition, where signal charges produced by one image sensor can be satisfactorily transferred over the vertical transfer path, but signal charges produced by another image sensor will overflow the potential well connected to the other image sensor.

SUMMARY OF THE INVENTION

It is an object of the present invention to provide a solid-state image pickup apparatus which, before signal charges pass through an output amplifier, causes a reduction in dark current and multiplication by impact ionization to be compatible with each other according to image pickup circumstances.

In accordance with the present invention, a solid-state image pickup apparatus comprises: an image pickup section including an array of photo-sensors arranged in rows and columns so as to of pixels for photoelectrically converting incident light to corresponding signal charges, a plurality of vertical transfer paths arranged in columns for vertically transferring the signal charges one row at a time, and a plurality of read-out gates each connected to one of the photo-sensors for reading out the signal charges stored on the one photo-sensor to corresponding one of the vertical transfer paths; a vertical driver for driving and controlling the vertical transfer paths and the read-out gates; and a controller for controlling the image pickup section through the vertical driver. The controller selects one of a plurality of transfer modes which are different from one another in potential well capacity in the vertical transfer paths according to a decision result of image pickup circumstances. In a first image pickup circumstance in which dark current is liable to occur in the vertical transfer paths, first one of the transfer modes in which the potential well capacity is relatively small is selected as the one transfer mode, and in a second image pickup circumstance in which the dark current is small in quantity, second one of the transfer modes which is greater in potential well capacity than the first transfer mode is selected as the one transfer mode. The afore mentioned vertical driver feeds the vertical transfer paths with a vertical drive signal that provides potential well capacity according to the selected transfer mode. The controller selects one of a plurality of voltage modes which are different from one another in positive voltage applied to the read-out gates according to the decision result. The controller selects, in the first image pickup circumstance, a first voltage mode indicating such a relatively low positive voltage that can suppress impact ionization as the one voltage mode, and, in the second image pickup circumstance, a second voltage mode indicating a positive voltage higher than in the first voltage mode as the one voltage mode so that the impact ionization can occur. The aforementioned vertical driver feeds the read-out gates with a timing gate pulse which applies a positive voltage according to the voltage mode thus selected.

According to the solid-state image pickup apparatus of the present invention, a system controller decides, according to image pickup circumstances, whether or not dark current is liable to occur in the vertical transfer paths of the image pickup section. In the case where the dark current is liable to occur, when selecting the first transfer mode in which potential well capacity is equal to or less than a predetermined quantity, the system controller sets the low-voltage mode, thereby suppressing impact ionization at the read-out gates of the image pickup section and reducing the dark current in the vertical transfer paths of the image pickup section. In the case where the dark current is small in quantity, when selecting the second transfer mode greater in potential well capacity than the first transfer mode, the system controller sets the high-voltage mode, thereby causing impact ionization to occur so that signal charges are multiplied, and vertically transferring signal charges obtained without substantial loss.

In the solid-state image pickup apparatus of the present invention, the system controller decides the temperature of the image pickup section or time to expose the image pickup section, as image pickup circumstances. Particularly, when deciding exposure time, the system controller can decide a shutter time. When the temperature of the image pickup section is high, and when the exposure time is long and the shutter speed is low, it can be decided that the dark current is liable to occur. When the temperature of the image pickup section is low, and when the exposure time is short and the shutter speed is high, it can be decided that the dark current is small in quantity.

The solid-state image pickup apparatus of the present invention can further measure an impact ionization ratio beforehand and store it on a memory, and select the transfer mode according to the impact ionization ratio. For instance, with a signal charge quantity obtained in the low-voltage mode as a reference, let the multiplication factor of a signal charge quantity obtained in the high-voltage mode be defined as an impact ionization ratio. With respect to the impact ionization ratio in the low-voltage mode equal to 1.0, the impact ionization ratio in the high-voltage mode can be measured.

As a rule, during the high-voltage mode, the second transfer mode is selected in which potential well capacity is great. However, when the impact ionization ratio at the time of the high-voltage mode is less than a predetermined threshold value, the third transfer mode is selected which is larger in potential well capacity than the first transfer mode, and, otherwise, the fourth transfer mode is selected which is greater in potential well capacity than the third transfer mode. As a result, even if the impact ionization ratio defers from product of the image pickup section to product, the signal charges can be satisfactorily transferred vertically.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
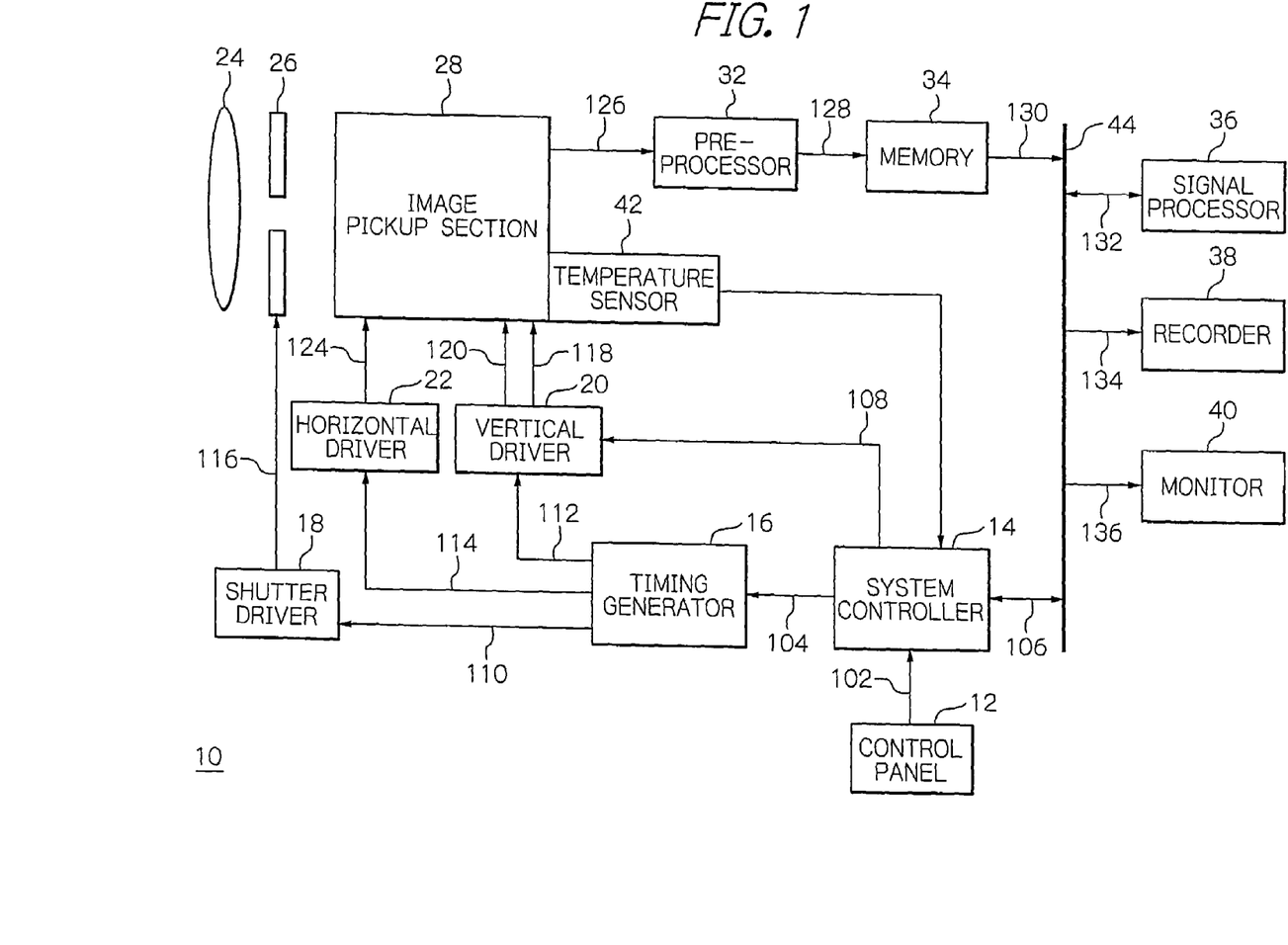
FIG. 1 is a schematic block diagram showing an embodiment of a solid-state image pickup apparatus in accordance with the present invention.

With reference to the accompanying drawings, an illustrative embodiment of the solid-state image pickup apparatus according to the present invention will be described in more detail. As shown in FIG. 1, the solid-state image pickup apparatus of the illustrative embodiment, generally designated by a reference numeral 10, is constructed such that it is controlled with a system controller 14 and a timing generator 16 in response to manipulating a control panel 12, and a shutter driver 18, a vertical driver 20 and a horizontal driver 22 cause incident light to be caught from a subject field via optics 24 through an optical shutter 26 to pick up the optical image of an imaging field with an image pickup section 28. Note that parts not directly relevant to understanding of the present invention will neither be described nor shown for avoiding redundancy.

The solid-state image pickup apparatus 10 is also constructed so that the image picked up with the image pickup section 28 is provided with an analog signal processing by a pre-processor 32 and is temporarily stored on a memory 34, and an image signal obtained from the memory 34 is provided with a digital signal processing by a signal processor 36 and is recorded by a recorder 38 and also displayed on a display monitor 40.

Particularly, in the illustrative embodiment, the solid-state image pickup apparatus 10 is further constructed to feed a read-out gate pulse such as a timing gate (TG) pulse to a read-out gate to obtain a signal charge from each photosensor of the image pickup section 28. The apparatus 10 is adapted to increase the positive voltage of the timing gate pulse so as to cause impact ionization to occur, thereby multiplying signal charges obtained.

The system controller 14 of the apparatus 10 is used to control the impact ionization and sets in the vertical driver 20 a positive voltage value suitable for image pickup circumstances such as environment and condition settings. The vertical driver 20 is constructed to feed the read-out gate with a timing gate pulse corresponding to the positive voltage value. Thus, the apparatus 10 variably controls the positive voltage to be applied to the read-out gate to thereby control the occurrence and suppression of impact ionization.

The solid-state image pickup apparatus 10 is able to set either one of the various voltage modes and generate a timing gate pulse for applying a positive voltage value corresponding to the voltage mode thus set. For example, when suppressing impact ionization, the apparatus 10 sets a low-voltage mode to make the positive voltage of a timing gate pulse low. When causing impact ionization to occur, the apparatus 10 sets a high-voltage mode to make the positive voltage high. For instance, when setting the low-voltage mode, the apparatus 10 generates a timing pulse for applying a normal positive voltage, e.g. 15 V. When setting the high-voltage mode, it generates a timing pulse for applying a positive voltage, e.g. 18 V, slightly higher than the normal positive voltage.

Figure 2:
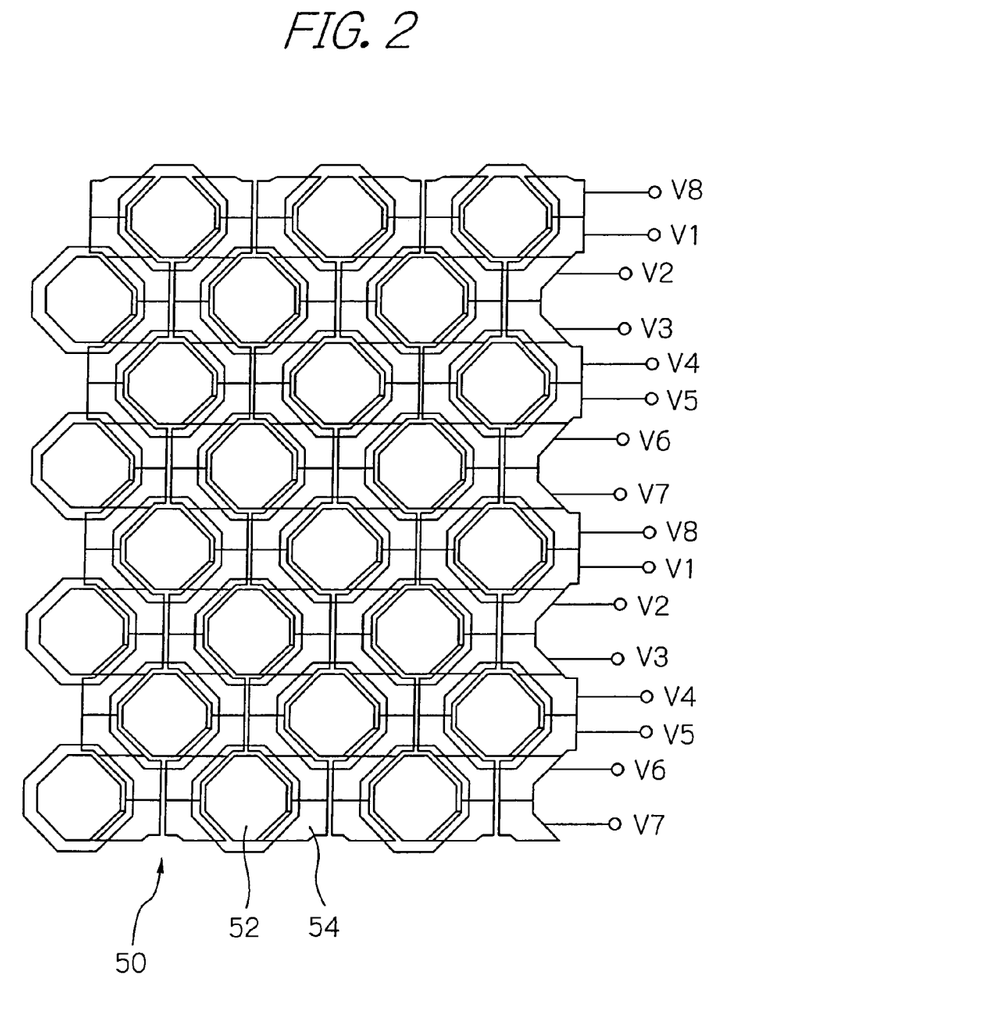
FIG. 2 is a schematic diagram showing part of the imaging surface of an image pickup section of the solid-state image pickup apparatus of the embodiment shown in FIG. 1.
Figure 3:
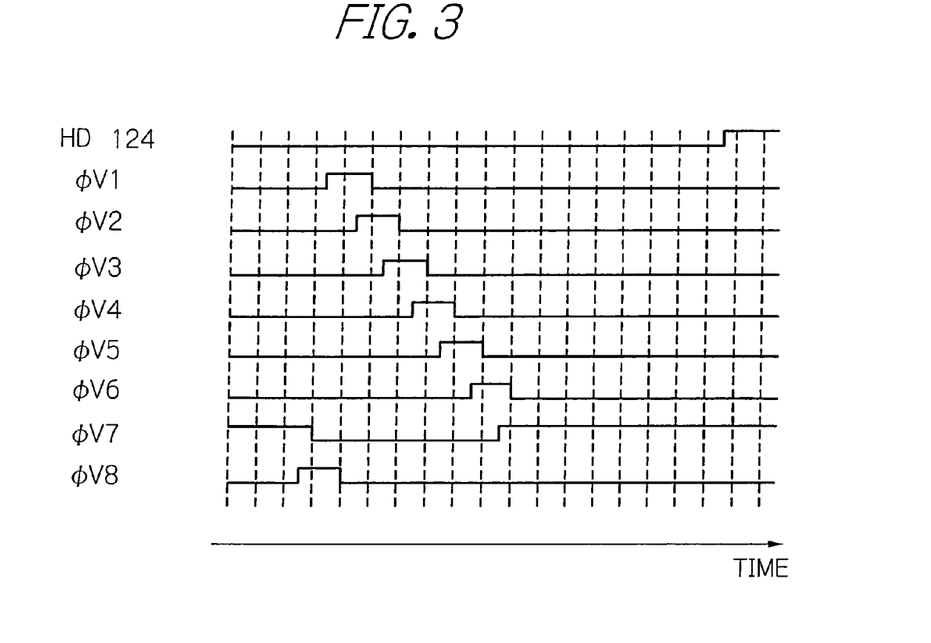
FIG. 3 is a timing chart useful for understanding an operation of the vertical drive in a 1-2 transfer mode of the solid-state image pickup apparatus of the embodiment shown in FIG. 1.

In the illustrative embodiment, the solid-state image pickup apparatus 10 can vary the capacity of potential wells formed, when transferring signal charges, in vertical transfer paths 54, FIG. 2, of the image pickup section 28, i.e. a transferable capacity, according to image pickup circumstances. In the illustrative embodiment, one of a plurality of transfer modes can be set and potential well capacities are variable from one transfer mode to another.

The apparatus 10 is constructed to set, for example, at least one of 2-3, 3-4, and 4-5 transfer modes. In the 2-3, 3-4, and 4-5 transfer modes, two, three, and four electrodes serve as standby electrodes during horizontal scanning, respectively.

The control panel 12 is a manual operation device that is adapted to receive instructions from an operator. The control panel 12 has a function of being responsive to the state of manual operation defined by the stroke of a shutter release key, not shown, depressed by the operator to provide a corresponding operation signal 102 to the system controller 14. Signals are designated by reference numerals attached to connections on which they appear.

The system controller 14 is a general controller adapted to control the apparatus 10 in response to the operation signal 102 fed from the control panel 12, and may be implemented by a central processing unit (CPU). The system controller 14 is operative in response to the operation signal 102 to generate a control signal 104, which is in turn supplied to the timing generator 16 for controlling the entire system 10.

The system controller 14 also connects with the memory 34, signal processor 36, recorder 38, and monitor 40 through a connecting line 106 and bus 44, and can generate control signals for controlling them to feed them with the control signals and receive required data from them.

The system controller 14 of the illustrative embodiment selects any one of the plurality of transfer modes in accordance with image pickup circumstances, generates the control signal 104 instructing an image pickup in the selected transfer mode, and feeds the control signal 104 to the timing generator 16. The controller 14 further sets a voltage mode according to image pickup circumstances, generates a control signal 108 indicating the voltage mode, and feeds the control signal 108 to the vertical driver 20.

For example, in the image pickup circumstances where dark current is liable to be conducted in the vertical transfer paths 54 of the image pickup section 28, the system controller 14 preferably selects a first transfer mode, such as a small-quantity transfer mode, in which potential well capacity is a predetermined quantity, e.g. relatively small, in order to suppress the dark current, together with the low-voltage mode. Conversely, in the image pickup circumstances where the dark current is not liable to be generated, in order to transfer all of the signal charges produced, the controller 14 advantageously selects a second transfer mode, such as a large-quantity transfer mode, in which potential well capacity is larger than the first transfer mode, together with the high-voltage mode for multiplying signal charges.

The system controller 14 may set a voltage mode in response to the transfer mode thus set. For example, it may set the low-voltage mode when selecting the first transfer mode and the high-voltage mode when selecting the second transfer mode.

The timing generator 16 has an oscillator for generating a fundamental clock signal for operating the apparatus 10, although not shown, and functions to feed the fundamental clock signal to the portions of the system 10. The timing generator 16 generates timing signals 110, 112, and 114 in response to the control signal 104 fed from the system controller 14, and feeds the timing signals to the shutter driver 18, vertical driver 20, and horizontal driver 22 to control them, respectively.

Specifically in the illustrative embodiment, the timing generator 16 is adapted to generate the timing signal 112 in response to the transfer mode instructed by the control signal 104.

The shutter driver 18 functions to drive the shutter 26. More specifically, the shutter driver 18 generates a drive signal 116 in response to the timing signal 110 from the timing generator 16, and feeds the drive signal 116 to the shutter 26 so that a desired exposure time is obtained.

The vertical driver 20 functions to drive the vertical transfer paths 54 of the image pickup section 28. More specifically, the vertical driver 20 generates a timing gate pulse 118 and a vertical drive signal 120, and feeds them to the read-out gates and vertical transfer paths 54 of the image pickup section 28, respectively.

Specifically in the illustrative embodiment, the vertical driver 20 is adapted to generate a vertical drive signal 120 that has different phases in response to the transfer mode instructed by the timing signal 112. Also, the vertical driver 20 is operative in response to the control signal 108 indicating a voltage mode from the system controller 14 to generate a timing gate pulse 118 that applies a positive voltage indicated by this voltage mode.

For instance, in the case where the vertical transfer paths 54 of the image pickup section 28 are constructed, as shown in FIG. 2, to have vertical transfer electrodes V1 to V8 of eight phases, the vertical driver 20 feeds drive signals øV1 to øV8 to the respective vertical transfer electrodes V1 to V8 as the vertical drive signal 120 to drive the vertical transfer paths 54.

The vertical driver 20 may drive the vertical transfer paths 54 in the 1-2 transfer mode, 2-3 transfer mode, 3-4 transfer mode, or 4-5 transfer mode as shown in FIGS. 3, 4, 5, and 6, respectively, thus, the potential well capacities of the vertical drive signals øV1 to øV8 differing from one transfer mode to another. In these transfer modes, when the 1-2 transfer mode is selected the potential well capacity is smallest, and when the 4-5 transfer mode is selected the potential wall capacity is greatest.

For example, in the 1-2 transfer mode, after the horizontal drive signal 124 has operated, the number of electrodes for giving the vertical drive signal 120 is changed from 1 to 2 to vertically transfer signal charges. After the number of electrodes is returned to 2 again, this operation is repeated. Similarly, in the 2-3 transfer mode, 3-4 transfer mode, or 4-5 transfer mode, the number of electrodes for giving the vertical drive signal 120 is changed from 2 to 3, from 3 to 4, and from 4 to 5, respectively.

The horizontal driver 22 functions to drive the horizontal transfer path, not shown, of the image pickup section 28. More specifically, it generates a horizontal drive signal 124 in response to the timing signal 114 from the timing generator 16, and feeds the signal 124 to the horizontal transfer path to control the drive thereon.

The optics 24 and shutter 26 constitute an optics mechanism through which the light from a desired field to be shot is incident on the image pickup section 28.

The optical lens system 24 comprises a plurality of lenses and is used for adjusting the angle of view and focal distance of an imaging field.

The shutter 26 may be an electronic and/or mechanical shutter and is constructed to open and close in response to the drive signal 116 from the shutter driver 18 to accomplish a desired or appropriate exposure time, thereby adjusting the light quantity from an imaging field.

Although not shown, the image pickup section 28 is constructed to include an imaging surface or photosensitive cell array 50 corresponding to a frame of image to be captured, and horizontal transfer path. The image pickup section 28 converts the optical image of an imaging field formed on the imaging surface 50 to an electrical signal 126 and feeds the signal 126 to the pre-processor 32. The image pickup section 28 may be an image sensor such as a charge-coupled device (CCD) type of sensor.

As shown in FIG. 2, the imaging surface 50 has a plurality of photo-sensors 52 arranged in row and column directions of the imaging frame so as to correspond to an array of pixels. The photo-sensors 52 in each column are connected to a vertical transfer path 54 associated therewith. For instance, alternate photo-sensors 52 may be disposed in the form of so-called honeycomb in the row and column directions with the illustrative embodiment. The photo-sensors 52 function to photoelectrically convert incident light obtained through the optics 24 and shutter 26 to corresponding signal charges. The imaging surface 50 of the illustrative embodiment can actually contain a large number of photo-sensors 52, but in FIG. 2, there are shown only some of those photo-sensors 52 for avoiding complexity. Likewise, the imaging surface 50 can actually contain a large number of vertical transfer paths 54, although all of them are not depicted.

The vertical transfer paths 54 are constructed to have the electrodes of vertical transfer voltages V1 to V8 of 8 phases different from each other, and operate in response to drive signals øV1 to øV8 which are input as a vertical drive signal 120 from the vertical driver 20, respectively.

The image pickup section 28 is provided with read-out gates, not specifically shown, each of which is disposed between one of the photo-sensors 52 and corresponding one of the vertical transfer paths 54. The image pickup section 28 is constructed to normally close the read-out gate to store a signal charge generated on the photo-sensor 52, and open the read-out gate in response to the timing gate pulse 118 from the vertical driver 20 to read out the stored signal charge to the vertical transfer path 54.

The vertical transfer path 54 is constructed to shift the signal charges, obtained from the photo-sensors 52, in the vertical direction in FIG. 2, or of the imaging frame, in response to the vertical drive signal 120 from the vertical driver 20 and transfers the thus shifted signals ultimately to the horizontal transfer path, in such a manner that one horizontal line, or row, of signal charge is shifted at a time. The horizontal transfer path is constructed to receive a horizontal line of signal charges thus transferred to shift the horizontal line of signal charges in the horizontal direction of the imaging frame in response to the horizontal drive signal 124 to ultimately feed the shifted signal charges to an output circuit, not shown, which in turn generates a corresponding analog electric signal 126 representing the optical image.

The pre-processor 32 is constructed to provide the analog electric signal 126 fed from the image pickup section 28 with an analog signal processing such as the correlated double sampling or automatic gain control. The pre-processor 32 further analog-to-digital converts the analog electric signal 126 to a digital image signal 128 and outputs the resultant signal 128 to the memory 34 for storage.

The memory 34 functions as an image data memory to temporarily store the fed digital signal 128 and further output the stored digital signal 130. The memory 34 connects with a bus 44 by the connecting line 130 and further connects with the system controller 14, signal processor 36, recorder 38, and monitor 40 through the bus 44. For instance, the memory 34 is controlled by the system controller 14 so that it can feed the stored digital signal 130 to the signal processor 36, recorder 38, and monitor 40 over the bus 44 in the form of digital signal 132, 134 and 136, respectively.

The signal processor 36 connects with the bus 44 by the connecting line 132 and further connects with the system controller 14, memory 34, recorder 38, and monitor 40 by the bus 44. The signal processor 36 is constructed so that under control of the system controller 14, it receives the digital image signal 130 stored on the memory 34 read out on the connecting line 132 and provide the signal 130 with a digital signal processing. The signal processor 36 may provide the digital image signal 132 with the digital signal processing such as an offset correction, a white balance correction, a gamma correction, and synchronization, and the digital image signal 132 after thus processed may be again stored on the memory 34.

The recorder 38 connects with the bus 44 by the connecting line 134, and it can receive the image signal 130 stored on the memory 34 and the image signal 132 processed in the signal processor 36 as the image signal 134 for recording. For example, the recorder 38 is constructed to have a memory card interface and a memory card and record an image signal on the memory card through the card interface. The memory card may be detachable.

The display monitor 40 connects with the bus 44 by the connecting line 136, and it can receive the image signal 130 stored on the memory 34 or the image signal 132 processed in the signal processor 36 as the image signal 136 and visualize and display the image signal 136 on its display screen, such as a liquid crystal display, not shown.

Next, the operation of the solid-state image pickup apparatus 10 of the illustrative embodiment will be described with reference to the timing chart shown in FIG. 7 as an example of suppressing dark current according to circumstances for picking up an image.

First, when the operator depresses the shutter release key of the control panel 12 to pick up a desired field, an operation signal 102 instructing an image pickup is fed from the control panel 12 to the system controller 14.

In order to suppress the dark current, for example, the system controller 14 has selected the first transfer mode in which the potential well capacity is small, e.g. the 2-3 transfer mode, and also generates a control signal 108 for setting the low-voltage mode, e.g. the positive voltage of 15 V, and feeds the appropriate control signal 108 to the vertical driver 20.

In response to the operation signal 102 from the control panel 12, the system controller 14 generates a control signal 104 instructing the image pickup in the 2-3 transfer mode, and feeds the control signal 104 to the timing generator 16. In response to the control signal 104, the timing generator 16 generates timing signals 110 and 114 instructing the image pickup and feeds the signals 110 and 114 to the shutter driver 18 and horizontal driver 22. The timing generator 16 also generates a timing signal 112 instructing the image pickup in the 2-3 transfer mode and feeds the signal 112 to the vertical driver 20.

Figure 7:
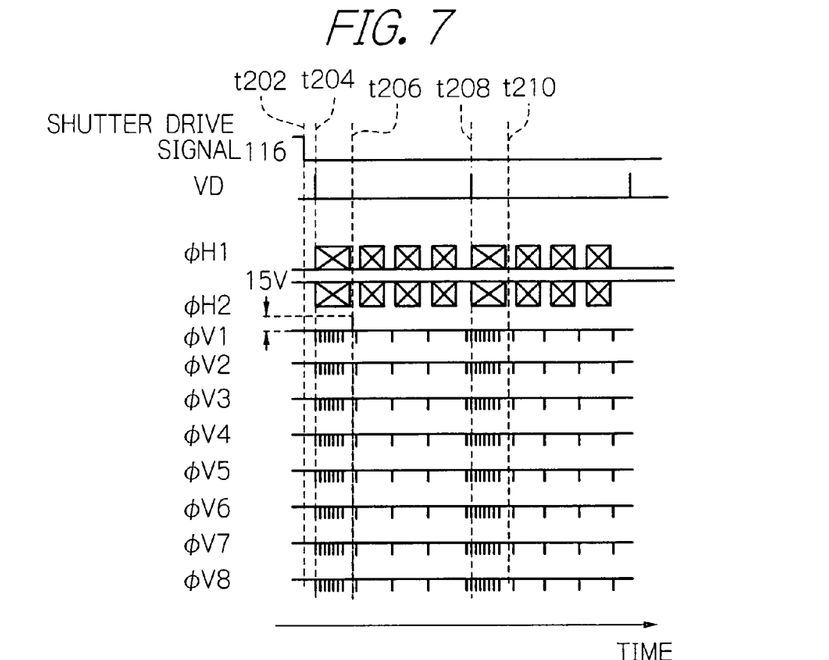
FIG. 7 is a timing chart useful for understanding an operation in a low-voltage mode of the solid-state image pickup apparatus of the embodiment shown in FIG. 1.

In response to the timing signal 110, the shutter driver 18 feeds to the shutter 26 a drive signal 116 which opens the shutter 26 at time t202, as shown in FIG. 7. The light from the desired field is incident on the image pickup section 28, in which signal charges corresponding to an optical image of the desired field are stored on the photo-sensors 52.

In the vertical driver 20, in response to the timing signal 112 instructing the image pickup, a vertical synchronous signal VD occurs at time t204. In the horizontal driver 22, in response to the timing signal 114 instructing the image pickup, a horizontal drive signal 124 is generated. In the illustrative embodiment, the horizontal drive signals øH1 and øH2 of two phases are generated and fed to the horizontal transfer path of the image pickup section 28, whereby a smear sweeping-out operation is performed.

In response to the vertical synchronous signal VD at time t204, the vertical driver 20 generates a timing gate pulse 118 based on the low-voltage mode control signal 108, and the timing gate pulse 118 which applies the positive voltage of 15 V at time t206 is fed to the read-out gates provided on the vertical transfer electrodes V1 and V3 of the image pickup section 28. In FIG. 7, the timing gate pulse indicating the positive voltage of 15 V is described in the vertical drive signals øV1 to øV8 for convenience, but this means that the positive voltage pulse is fed to the vertical transfer electrodes V1 to V8 at a time.

In response to the timing gate pulse 118, the read-out gates of the electrodes V1 and V3 are opened, so that the signal charges stored on the photo-sensors on the horizontal lines corresponding to the electrodes V1 and V3 are transferred to the vertical transfer paths. In this case, the positive voltage applied to the read-out gates is 15 V, so impact ionization is suppressed so that signal charges are not multiplied.

Figure 4:
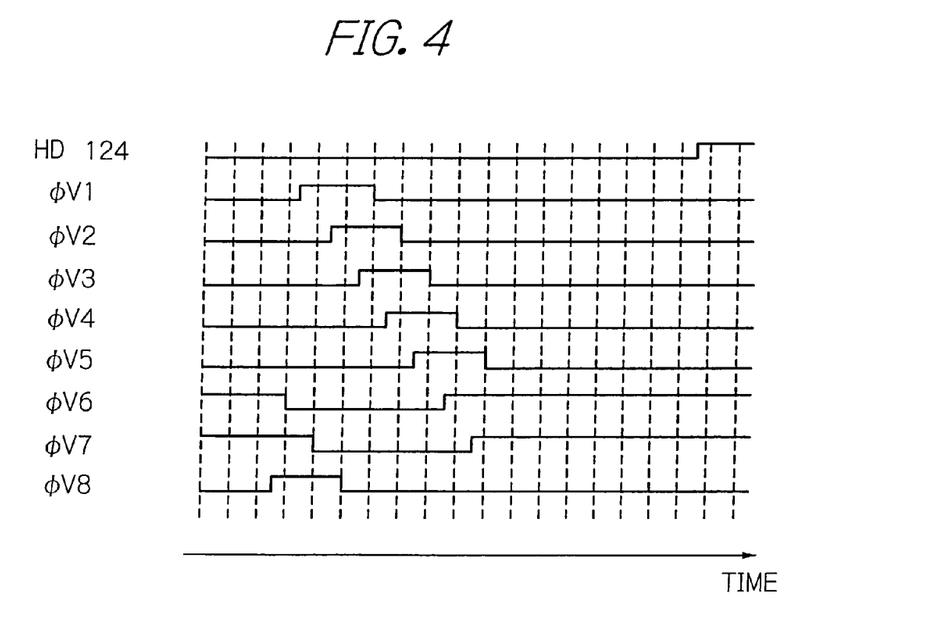
FIG. 4 is a timing chart useful for understanding an operation of the vertical drive in a 2-3 transfer mode of the solid-state image pickup apparatus of the embodiment shown in FIG. 1.

The vertical driver 20, as shown in FIG. 4, generates drive signals øV1 to øV8 as the vertical drive signal 120 corresponding to the 2-3 transfer mode and feeds the signals to the vertical transfer paths. The signal charges read out from the horizontal lines corresponding to the electrodes V1 and V3 to the vertical transfer paths are shifted in the vertical direction according to the drive signal 120 and are sent to the horizontal transfer path. They are further transferred horizontally according to the horizontal drive signal 124.

Next, the vertical driver 20 generates a 15-V timing gate pulse 118 based on the low-voltage mode 108 at time t210, according to the vertical synchronous signal VD that occurs at time t208, and feeds the pulse 118 to the read-out gates provided on the vertical transfer electrodes V5 and V7.

As a result, the signal charges on the photo-sensors 52 on the horizontal lines corresponding to the electrodes V5 and V7, as with the aforementioned, are sent to the vertical transfer paths without being multiplied and are shifted in the vertical direction according to the vertical drive signal 120 of the 2-3 transfer mode, and sent to the horizontal transfer path and are further transferred horizontally according to the horizontal drive signal 124.

As set forth above, the signal charges transferred horizontally by the horizontal transfer path are converted to an analog electric signal 126, which is fed to the pre-processor 32. The pre-processor 32 provides the analog electric signal 126 with analog signal processing to generate a digital image signal 128. The digital image signal 128 is stored on the memory 34.

In the illustrative embodiment, in FIG. 7, the timing gate pulse 118 is fed to apply the positive voltage to only electrodes V1, V3, V5, and V7, but thereafter, the timing gate pulse 118 is also fed to apply the positive voltage to electrodes V2, V4, V6, and V8, too.

The digital image signal 130 stored on the memory 34 is also controlled by the system controller 14, whereby it is provided with digital signal processing by the signal processor 36, is recorded on the recorder 38, and is displayed on the monitor 40. In this manner, the image pickup operation by the solid-state image pickup apparatus 10 of the illustrative embodiment ends.

Figure 8:
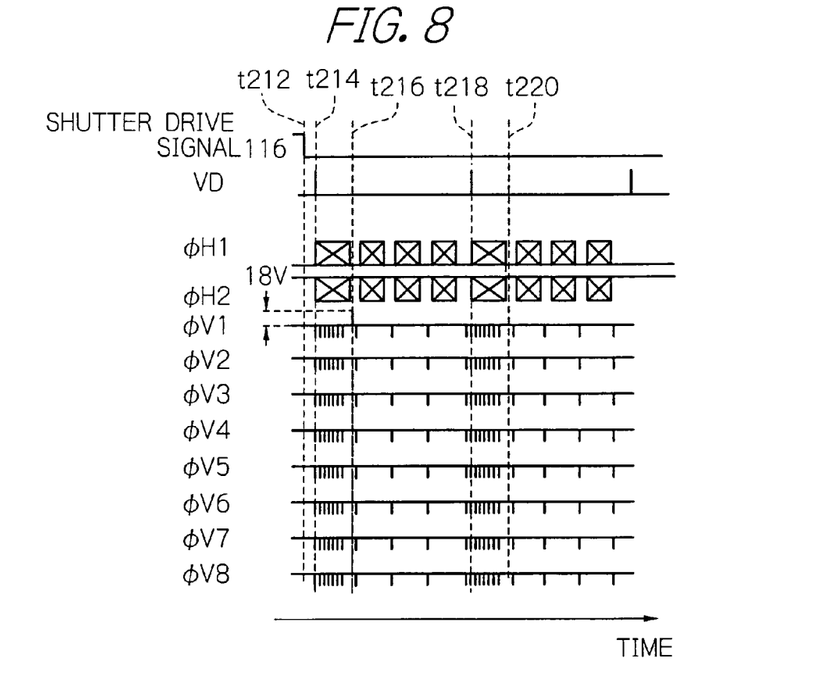
FIG. 8 is a timing chart useful for understanding an operation in a high-voltage mode of the solid-state image pickup apparatus of the embodiment shown in FIG. 1.

Next, the operation of the solid-state image pickup apparatus 10 of the illustrative embodiment will be described with reference to the timing chart shown in FIG. 8 as an example of causing impact ionization to occur according to circumstances for picking up an image. Note that only points differing from the example of FIG. 7 will be described for avoiding redundancy.

First, the system controller 14 selects the second transfer mode in which potential well capacity is great, e.g. the 3-4 transfer mode, in order to transfer every signal charge, and generates a control signal 108 which sets the high-voltage mode, e.g. the positive voltage of 18 V, in order to cause the impact ionization to occur.

In response to the manipulation signal 102 instructing an image pickup, the system controller 14 also generates a control signal 104 which instructs the image pickup in the 3-4 transfer mode. In response to this control signal 104, the timing generator 16 generates a timing signal 112 which instructs the image pickup in the 3-4 transfer mode.

In this case, in response to the vertical synchronous signal VD at time t214, the vertical driver 20 generates a timing gate pulse 118 which applies the positive voltage of 18 V, based on the high-voltage mode control signal 108 at time t216, and feeds the timing gate pulse 118 to the read-out gates provided on the vertical transfer electrodes V1 and V3 of the image pickup section 28.

As a result, the read-out gates on the electrodes V1 and V3 are opened and the signal charges stored on the photo-sensors 52 in the horizontal lines corresponding to the electrodes V1 and V3 are sent to the vertical transfer paths. At this stage, the voltage of 18 V is applied to the read-out gates, so that the impact ionization occurs and signal charges are multiplied.

Figure 5:
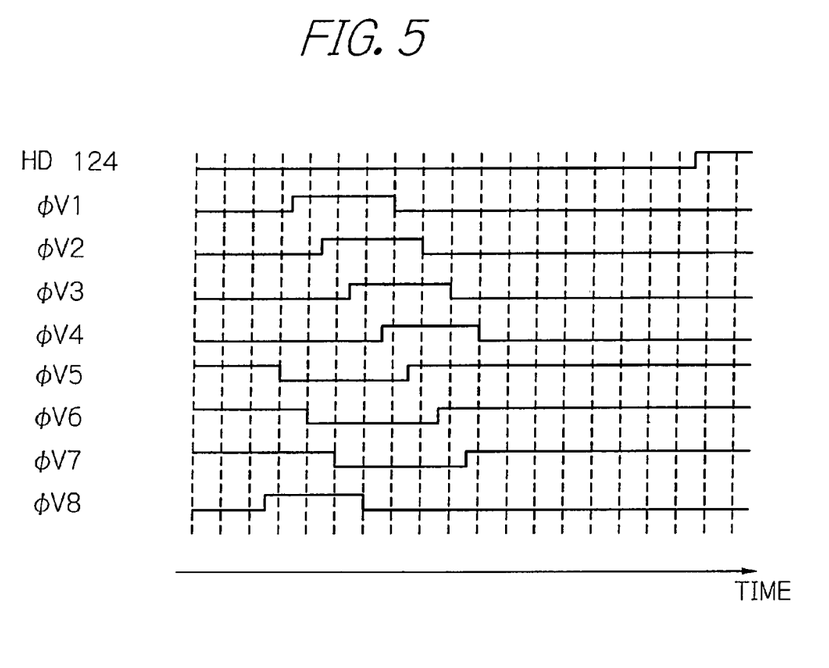
FIG. 5 is a timing chart useful for understanding an operation of the vertical drive in a 3-4 transfer mode of the solid-state image pickup apparatus of the embodiment shown in FIG. 1.
Figure 6:
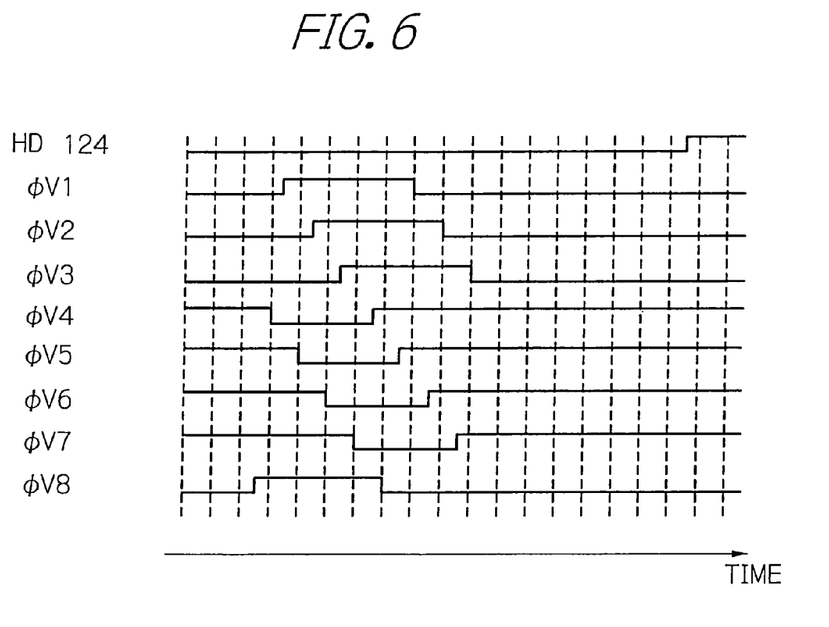
FIG. 6 is a timing chart useful for understanding an operation of the vertical drive in a 4-5 transfer mode of the solid-state image pickup apparatus of the embodiment shown in FIG. 1.

As shown in FIG. 5, the vertical driver 20 generates a vertical drive signal 120 according to the 3-4 transfer mode and feeds the signal 120 to the vertical transfer paths. In response to the vertical drive signal 120, the signal charges read out from the horizontal lines corresponding to the electrodes V1 and V3 are shifted in the vertical direction.

Thus, in the illustrative embodiment, the transferable capacity is increased by the 3-4 transfer mode, so that the signal charges multiplied by impact ionization can be all transferred vertically.

Next, in response to the vertical synchronous signal VD that occurs at time t218, the vertical driver 20 generates an 18-V timing gate pulse 118 based on the high-voltage mode 108 at time t220, and feeds the pulse 118 to read-out gates provided on vertical transfer electrodes V5 and V7.

As a result, the signal charges on the photo-sensors 52 on the horizontal lines corresponding to the electrodes V5 and V7, as with the aforementioned, are multiplied and sent to the vertical transfer paths and are further shifted in the vertical direction in response to the vertical drive signal 120 of the 3-4 transfer mode.

The apparatus 10 further may have a temperature sensor 42 that senses the temperature of the image pickup section 28 or the surrounding temperature, and is constructed to feed the temperature data 140 indicative of the sense temperature to the system controller 14. The system controller 14 of the illustrative embodiment uses the temperature data 140 to decide image pickup circumstances so that it can select a transfer mode according to the temperature data 140 and generate a control signal 104 which instructs an image pickup in the selected transfer mode.

The system controller 14 may also set a voltage mode in accordance with the temperature data 140 sensed with the temperature sensor 42, and generate a control signal 108 indicating the voltage mode.

For example, when the temperature data 140 indicates a higher temperature than a predetermined threshold value, the system controller 14 determines that dark current is liable to occur, selects the first transfer mode to suppress the dark current, and sets the low-voltage mode to suppress impact ionization in reading out signal charges from the photo-sensors 52 of the image pickup section 28. When the temperature data 140 indicates a lower temperature than the predetermined threshold value, the system controller 14 determines the dark current to be small in quantity and selects the second transfer mode to transfer all of the signal charges obtained, and sets the high-voltage mode to cause the impact ionization to occur in reading out signal charges.

The operation of the solid-state image pickup apparatus 10 of the illustrative embodiment will be described with reference to the flowchart shown in FIG. 9 as an example of deciding the image pickup circumstances by employing the temperature data 140 indicating the temperature of the image pickup section 28 or the surrounding temperature for picking up an image.

First, if the operator depresses the shutter release key of the control panel 12 to pick up a desired field, the image pickup is started (step S302) and an operation signal 102 instructing the image pickup is fed to the system controller 14.

The system controller 14 acquires temperature data 140, for example, by controlling the temperature sensor 42 in response to the operation signal 102 (S304).

The system controller 14 also determines whether or not the temperature indicated by the temperature data 140 is higher than a predetermined threshold value (S306). When it is greater, the operation advances to step S308. In the case other than that, the operation advances to step S310.

In step S308, the system controller 14 determines that dark current is liable to occur in the vertical transfer paths of the image pickup section 28, and therefore sets the low-voltage mode, and further selects the first transfer mode (S312). In the illustrative embodiment, in step S308, the system controller 14 generates a control signal 108 which sets the voltage of 15 V as the low-voltage mode, and in step S312, the system controller 14 generates a control signal 104 which instructs the image pickup in the 2-3 transfer mode as the first transfer mode.

Thereafter, the system controller 14 feeds the control signal 108 to the vertical driver 20 and the control signal 104 to the timing generator 16. In response to the control signal 104, the timing generator 16 generates a timing gate signal. Thereafter, a desired field is picked up in the same manner as the operation described with reference to FIG. 7 (step S316).

In step S310, the system controller 14 determines that a small quantity of the dark current will occur in the vertical transfer paths of the image pickup section 28 and therefore sets the high-voltage mode, and also selects the second transfer mode (S314). In the illustrative embodiment, in step S310, the system controller 14 generates a control signal 108 which sets 18 V as the high-voltage mode, and in step S314, the system controller 14 generates a control signal 104 which instructs the image pickup in the 3-4 transfer mode, as the second transfer mode.

In step S316, the system controller 14 feeds the control signal 108 to the vertical driver 20 and the control signal 104 to the timing generator 16, and in response a desired field is picked up.

Further, the system controller 14 of the apparatus 10 may be adapted to determine that when the exposure time in the image pickup section 28 is long, dark current is increased, and that when the exposure time is short, the dark current is reduced.

When the exposure time is long, the system controller 14 selects the first transfer mode to suppress the dark current and generates a control signal 104, and also sets the low-voltage mode to suppress impact ionization in reading out signal charges and generates a control signal 108. When the exposure time is short, the system controller 14 selects the second transfer mode to transfer all of the signal charges obtained and generates a control signal 104, and also sets the high-voltage mode to cause the impact ionization to occur in reading out signal charges and generates a control signal 108.

For instance, the apparatus 10 is able to pick up a desire field in a settable shutter speed mode, and the system controller 14 is able to decide exposure time according to the shutter speed mode. The apparatus 10 of the illustrative embodiment can set any of the various shutter speed modes such as a high-speed shutter mode and a low-speed shutter mode.

For example, when the shutter speed mode is of a lower speed than a predetermined threshold value, the system controller 14 may determine that the exposure time is long. When the shutter speed mode is of a higher speed than the predetermined threshold value, the system controller 14 may determine that the exposure time is short.

Figure 10:
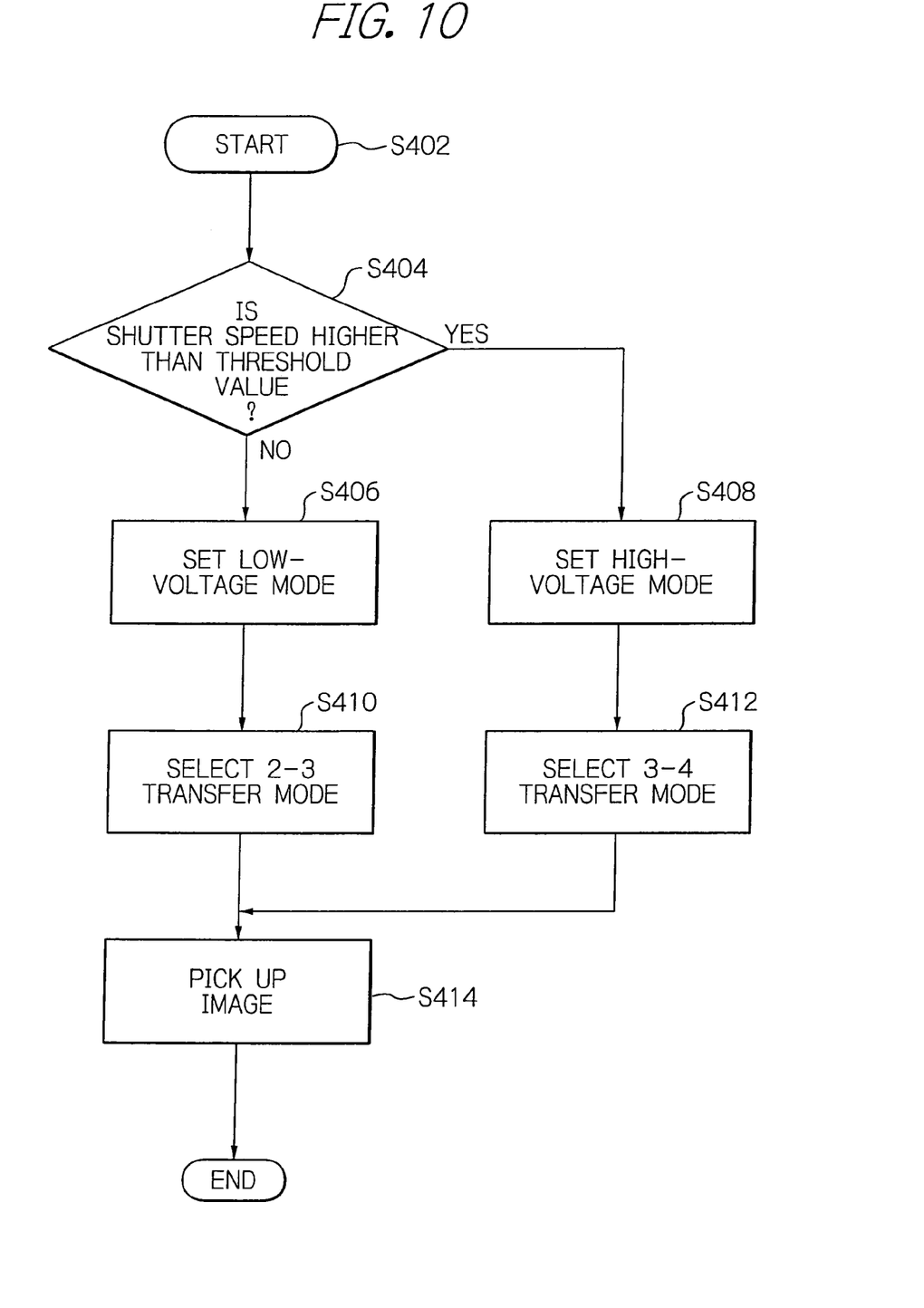
FIG. 10 is a flowchart useful for understanding an alternative operational procedure of the solid-state image pickup apparatus of the embodiment shown in FIG. 1.

Next, the operation of the solid-state image pickup apparatus 10 of the illustrative embodiment will be described with reference to the flowchart shown in FIG. 10 as an example of deciding the image pickup circumstances by employing exposure time of the image pickup section 28, i.e. shutter speed modes, for picking up an image.

Figure 9:
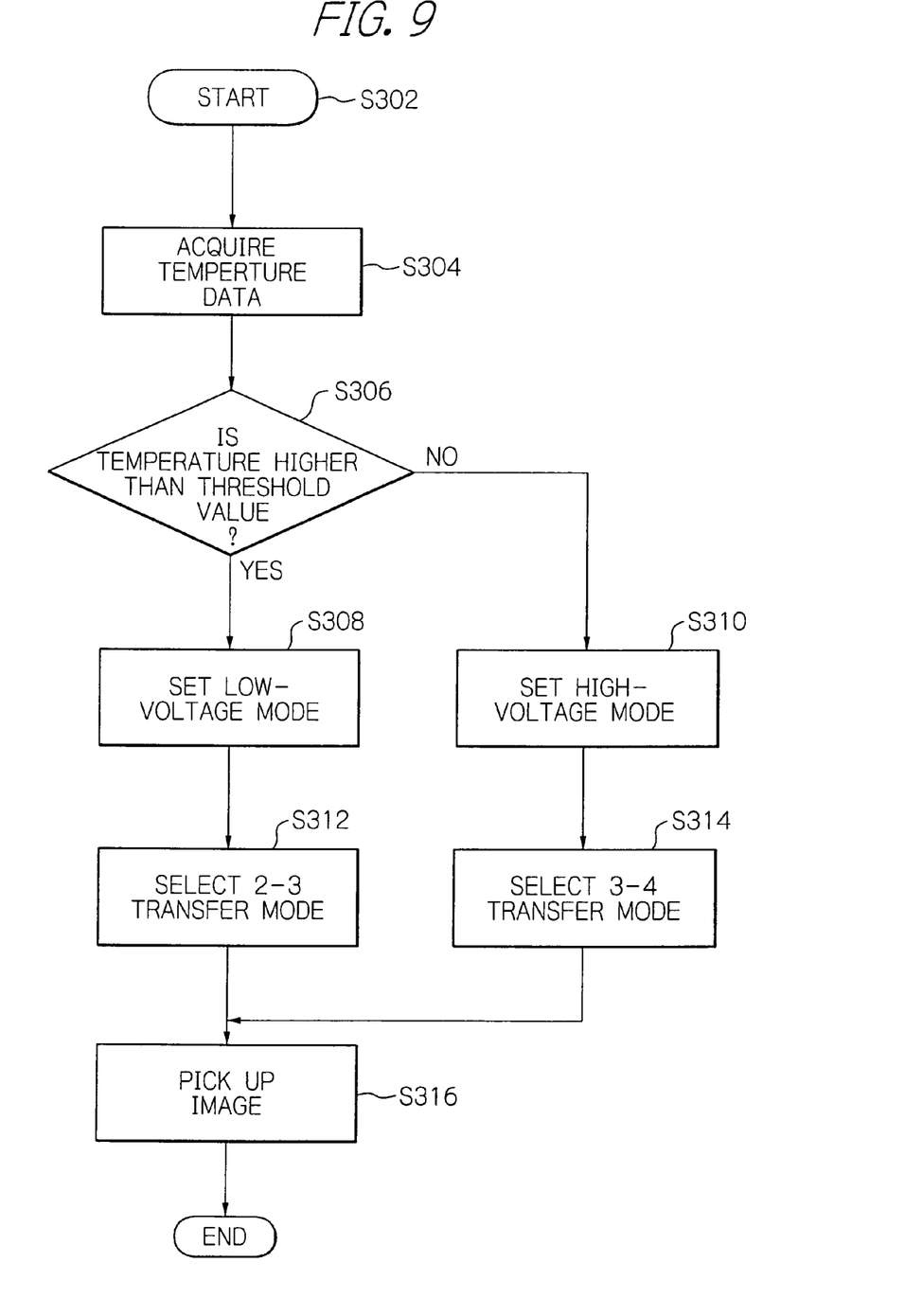
FIG. 9 is a flowchart useful for understanding an operational procedure of the solid-state image pickup apparatus of the embodiment shown in FIG. 1.

As with step S302 of FIG. 9, if the operator depresses the shutter release key of the control panel 12 to pick up a desired field, the image pickup is started (S402) and an operation signal 102 instructing an image pickup is fed to the system controller 14.

The system controller 14 determines which of the shutter modes has been set in the apparatus 10 (S404). When the high-speed shutter mode has been set the operation advances to step S408, and when the low-speed mode has been set the operation advances to step S406.

In step S406, as with step S308 of FIG. 9, the system controller 14 determines that dark current is liable to occur and therefore sets the low-voltage mode of 15 V, and also selects the 2-3 transfer mode as the first transfer mode (S410).

In step S408, as with step S310 of FIG. 9, the system controller 14 determines that the dark current is not liable to occur and therefore sets the high-voltage mode of 18 V, and also selects the 3-4 transfer mode as the second transfer mode (S412).

As with the operation example shown in FIG. 9, in step S414 following thereto, the control signal 108 indicating the voltage mode which was set is fed to the vertical driver 20, the control signal 104 instructing the image pickup in the selected transfer mode is fed to the timing generator 16, and a desired field is picked up.

The apparatus 10 of the illustrative embodiment may further be constructed to measure an impact ionization ratio beforehand and store the data indicative of the measured ionization ratio on the memory 34, and select a transfer mode according to the impact ionization ratio thus measured.

In the apparatus 10, when reading out signal charges from the photo-sensors 52 of the image pickup section 28, a low voltage or high voltage is applied to each of the read-out gates so that impact ionization to act on each signal charge read out is suppressed or caused to occur. That is, in the low voltage and high-voltage modes, if the same field is picked up with the same conditions, a larger quantity of signal charges is obtained in the high-voltage mode than in the low-voltage mode.

With respect to the quantity of signal charges obtained in the case of the low-voltage mode as reference, let the multiplication factor of the quantity of signal charges obtained in the case of the high-voltage mode be defined as an impact ionization ratio. Therefore, assuming the impact ionization ratio in the low-voltage mode is equal to 1.0, the impact ionization ratio in the high-voltage mode exceeds 1.0.

The image pickup section 28 may be different in property from one product to another. Even if the same imaging field is picked up under the same conditions by different products of image pickup section 28 with the positive voltage of the same value applied to the read-out gates, then the quantity of signal charges obtained would be different with the specific products used. As a result, there would be cases where the impact ionization ratio is dependent upon a specific product of the image pickup section 28 used.

For instance, where a first and a second CCD image sensor, manufactured as the image pickup section 28, are different in property, the vertical drive signal 120 in the 2-3 transfer mode and the timing gate pulse 118 in the low-voltage mode of 15 V applied to pick up a desired field under the same conditions would sometimes cause the signal charges obtained to differ in quantity between the first and second CCD image sensors. In this context, it is assumed that the impact ionization ratios of the first and second CCD image sensors in the low voltage reference mode are both equal to 1.0.

Also, even if the timing gate pulse 18 in the high-voltage mode of 18 V is fed to the first and second CCD image sensors, the signal charges obtained under the same conditions would similarly differ in quantity between both of the sensors. Since the first and second CCD image sensors are different from each other in quantity of signal charges in the low voltage mode as a reference, they are different in impact ionization ratio in the high-voltage mode from each other. For example, it is possible that the impact ionization ratio of the first CCD image sensor is equal to 1.8 while the impact ionization ratio of the second CCD sensor is equal to 1.4.

In the apparatus 10, when the high-voltage mode is set, the second transfer mode is selected in which the potential well capacity is great, but in the case where the impact ionization ratio in the high-voltage mode is higher, it is necessary to make the transferable capacity greater than in the case where it is low.

However, since the impact ionization ratio in the high-voltage mode is dependent upon a specific product of image pickup section 28, it would fairly be difficult to predetermine the second transfer mode that is suitable in common to all products of image pickup section 28. For example, if the second transfer mode is predetermined as a 3-4 transfer mode, the second CCD with an impact ionization ratio of 1.4 could transfer a sufficient quantity of signal charges vertically, but sometimes the first CCD with an impact ionization ratio of 1.8 could not transfer a sufficient quantity of signal charges.

If the second transfer mode is predetermined as the 4-5 transfer mode for transferring a greater amount of charge than the 3-4 transfer mode, the first CCD would be capable of sufficient vertical transfer, but there might be cases where a large quantity of dark current occurs in the second CCD.

The apparatus 10 of the illustrative embodiment is adapted to measure in advance the impact ionization ratio in the high-voltage mode of the image pickup section 28 and store the data indicative of the measured ratio on the memory 34, and the system controller 14 determines the impact ionization ratio to select a transfer mode according to the determined result.

In the apparatus 10, for example, at the initial setting such as shipping from the factory or at the start of operation, the system controller 14 may preferably measure the impactionization ratio. The impact-ionization-ratio measuring method may be of measuring a multiplication factor of the quantity of signal charges in the high-voltage mode, using the impact ionization ratio in the low-voltage mode as a reference value of 1.0, as described above.

In the illustrative embodiment, particularly when a second transfer mode can be selected, the system controller 14 can compare the impact ionization ratio stored on the memory 34 with a predetermined threshold value, and select one of a plurality of large-quantity transfer modes, in which are larger in potential well capacity than the first transfer mode, according to the decision result.

When the impact ionization ratio is smaller than the predetermined threshold value, the system controller 14 may select a first large-quantity transfer mode, which may be a third transfer mode which is larger in potential well capacity than the first transfer mode. Otherwise, the system controller 14 may select a second large-quantity transfer mode, which may be a fourth transfer mode, greater in potential well capacity than the third transfer mode. For instance, the system controller 14 may select the 3-4 transfer mode as the third transfer mode when the impact ionization ratio is lower than 1.5, and otherwise the 4-5 transfer mode as the fourth transfer mode.

Figure 11:
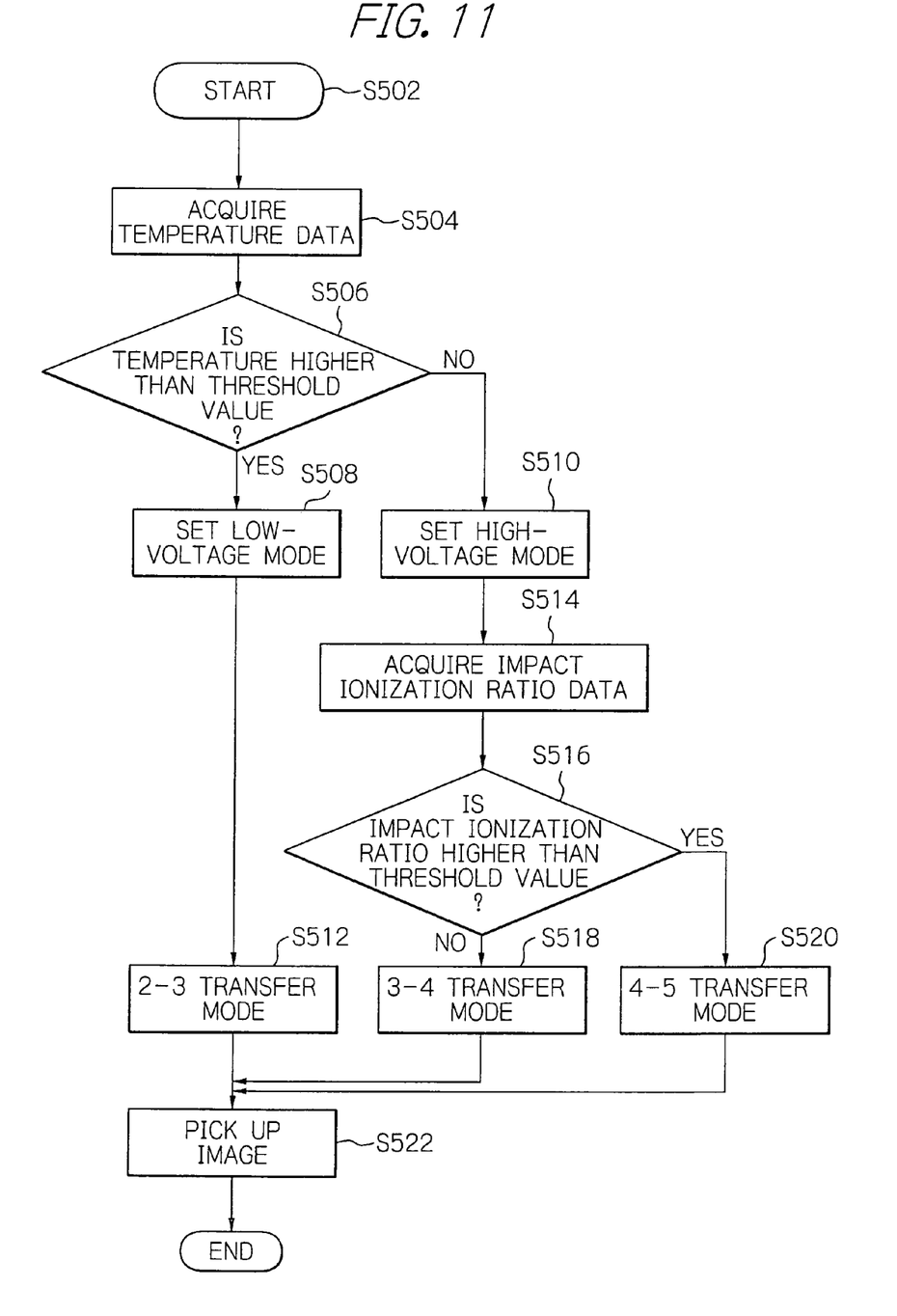
FIG. 11 is a flowchart useful for understanding another alternative operational procedure of the solid-state image pickup apparatus of the embodiment shown in FIG. 1.

The operation of the solid-state image pickup apparatus 10 of the illustrative embodiment will be described with reference to the flowchart shown in FIG. 11 as an example of selecting a transfer mode according to an impact ionization ratio. Note that the apparatus 10 employs the first or second CCD, described above, as the image pickup sections 28.

First, as with step S302 of FIG. 9, the image pickup operation of the apparatus 10 is started (S502). The system controller 14 decides image pickup circumstances and acquires, for example, temperature data 140 from the temperature sensor 42 (S504). The system controller 14 determines whether or not the temperature indicated by the temperature data 140 is higher than the predetermined threshold value (S506).

As a result of the decision in step S506, when the temperature indicated by the temperature data 140 is higher than the predetermined threshold value, the operation advances to S508. When it is smaller, the operation advances to step S510.

In step S508, the system controller 14 determines that dark current is liable to occur in the vertical transfer paths of the image pickup section 28 and therefore sets the low-voltage mode of 15 V, and also selects the 2-3 transfer mode as the first transfer mode (S512).

In step S510, the system controller 14 determines that a small quantity of the dark current will occur in the vertical transfer paths of the image pickup section 28 and therefore sets the high-voltage mode of 18 V, and also acquires the impact ionization ratio in the high-voltage mode from the memory 34 (S514).

Next, the system controller 14 determines whether or not the impact ionization ratio obtained in step S514 is smaller than the predetermined threshold value (S516). When it is smaller than the predetermined threshold value, the system controller 14 selects the 3-4 transfer mode as the third transfer mode (S518). In the case other than that, the system controller 14 selects the 4-5 transfer mode as the fourth transfer mode (S520).

As with the operation shown in FIG. 9, in step S522 following thereto, a control signal 108 indicative of a voltage mode which was set is applied to the vertical driver 20, a control signal 104 instructing the image pickup in the selected transfer mode is fed to the timing generator 16, and a desire field is picked up.

The entire disclosure of Japanese patent application No. 2006-267956 filed on Sep. 29, 2006, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:
an image pickup section including
an array of photo-sensors arranged in rows and columns of pixels for photoelectrically converting incident light to corresponding signal charges,
a plurality of vertical transfer paths arranged in columns for vertically transferring the signal charges one row at a time, and
a plurality of read-out gates each connected to one of said photo-sensors for reading out the signal charges stored on said one photo-sensor to corresponding one of said vertical transfer paths;
a vertical driver for driving and controlling said vertical transfer paths and said read-out gates;
a controller for controlling said image pickup section through said vertical driver: and
a memory for storing an impact ionization ratio which is specific to said image pickup section and measured in advance,
said controller selecting one of a plurality of transfer modes which are different from one another in potential well capacity in said vertical transfer paths according to a decision result of image pickup circumstances,
selecting, in a first image pickup circumstance in which dark current is liable to occur in said vertical transfer paths, first one of the transfer modes in which the potential well capacity is equal to or less than a predetermined quantity, and, in a second image pickup circumstance in which the dark current is small in quantity, second one of the transfer modes which is greater in the potential well capacity than the first transfer mode,
said vertical driver feeding said vertical transfer paths with a vertical drive signal that provides potential well capacity according to the selected transfer mode,
said controller selecting one of a plurality of voltage modes which are different from one another in positive voltage applied to said read-out gates according to the decision result of the image pickup circumstances;
selecting, in the first image pickup circumstance, first one of the voltage modes which indicates a relatively low positive voltage suppressing impact ionization, and, in the second image pickup circumstance, second one of the voltage modes which indicates a positive voltage higher than in the first voltage mode to cause the impact ionization,
said vertical driver feeding said read-out gates with a timing gate pulse which applies a positive voltage according to the voltage mode thus selected,
said controller selecting one of the transfer modes according to the impact ionization ratio stored.

2. The apparatus in accordance with claim 1, wherein said controller determines temperature data relating to said image pickup section as the image pickup circumstances so that, when the determined data indicates higher temperature than a predetermined value, the first image pickup circumstance is determined, and, when the determined temperature data indicates temperature equal to or lower than the predetermined value, the second image pickup circumstance is determined.

3. The apparatus in accordance with claim 1, wherein said controller determines exposure time to expose said array of photo-sensors so that, when the determined exposure time is longer than a predetermined threshold, the first image pickup circumstance is determined, and, when the determined exposure time is equal to or shorter than the predetermined threshold, the second image pickup circumstance is determined.

4. The apparatus in accordance with claim 1, wherein said controller determines a shutter speed in said image pickup section, so that when the determined shutter speed is equal to lower than a predetermined value, the first image pickup circumstance is selected, and, when the determined shutter speed is higher than the predetermined value, the second image pickup circumstance is selected in which the exposure time is shorter than in the first image pickup circumstance.

5. The apparatus in accordance with claim 1, wherein said controller selects, if the impact ionization ratio is less than a predetermined threshold value when selecting the second transfer mode, a third transfer mode which is larger in capacity of the potential well than the first transfer mode, and, otherwise, a fourth transfer mode which is greater in capacity of the potential well than the third transfer mode.

* * * * *